(12) United States Patent
Donohue

(10) Patent No.: US 11,636,199 B2
(45) Date of Patent: Apr. 25, 2023

(54) REAL TIME CLOCK WITH INTEGRATED ANTI-ROLLBACK PROTECTION

(71) Applicant: CORTINA ACCESS, INC., San Jose, CA (US)

(72) Inventor: Ryan Patrick Donohue, Sunnyvale, CA (US)

(73) Assignee: REALTEK SINGAPORE PTE LTD., Singapore (SG)

( * ) Notice: Subject to any disclaimer, the term of this patent is extended or adjusted under 35 U.S.C. 154(b) by 113 days.

(21) Appl. No.: 17/227,463

(22) Filed: Apr. 12, 2021

(65) Prior Publication Data

US 2022/0327202 A1 Oct. 13, 2022

(51) Int. Cl.
| | |
|---|---|
| *G06F 21/54* | (2013.01) |
| *G06F 21/57* | (2013.01) |
| *G06F 21/64* | (2013.01) |
| *G06F 21/72* | (2013.01) |

(Continued)

(52) U.S. Cl.
CPC ............... *G06F 21/54* (2013.01); *G06F 1/14* (2013.01); *G06F 21/725* (2013.01); *G06F 21/575* (2013.01); *G06F 21/64* (2013.01); *G06F 21/78* (2013.01)

(58) Field of Classification Search
CPC .......... G06F 21/54; G06F 1/14; G06F 21/725; G06F 21/78; G06F 21/64; G06F 21/575
See application file for complete search history.

(56) References Cited

U.S. PATENT DOCUMENTS

| | | |
|---|---|---|
| 10,261,701 B2 | 4/2019 | Dees et al. |
| 10,990,156 B2 | 4/2021 | Cheng et al. |
| 11,366,934 B2 * | 6/2022 | Chen ............... G06F 21/554 |

(Continued)

FOREIGN PATENT DOCUMENTS

| | | | | |
|---|---|---|---|---|
| CN | 1098490 C | * | 1/2003 | .......... G06F 11/1407 |
| CN | 112632642 A | | 4/2021 | |

(Continued)

OTHER PUBLICATIONS

"RTC Anti-rollback"—OLPC, Dec. 29, 2011 https://wiki.laptop.org/go/RTC_Anti-rollback (Year: 2011).*

(Continued)

*Primary Examiner* — Randy A Scott
(74) *Attorney, Agent, or Firm* — McClure, Qualey & Rodack, LLP

(57) ABSTRACT

A Real-Time Clock (RTC) block configured to output a current time as part of an ASIC configuration that guarantees that the RTC can never be rolled back beyond a checkpointed date and time. A checkpoint memory block is coupled to the RTC block and configured to include a stored active date/time checkpoint, and a set RTC logic block is coupled to the checkpoint memory block and to the RTC block and configured to permit setting the RTC block to an asserted new time request only when the asserted new time is in the future relative to the stored active date/time checkpoint. The active date/time checkpoint is stored in a non-volatile, single-write memory location such as in a one-time programmable (OTP) memory or in a bank of fuses so that the stored active date/time checkpoint is maintained whether or not power is interrupted to the checkpoint memory block.

14 Claims, 3 Drawing Sheets

(51) Int. Cl.
　　　*G06F 1/14*　　　(2006.01)
　　　*G06F 21/78*　　(2013.01)

(56) References Cited

U.S. PATENT DOCUMENTS

| | | |
|---|---|---|
| 2014/0095887 A1 | 4/2014 | Nayshtut et al. |
| 2014/0095918 A1* | 4/2014 | Stahl .................... G06F 21/725 |
| | | 713/500 |
| 2019/0025873 A1 | 1/2019 | Goodrich et al. |
| 2020/0151366 A1* | 5/2020 | Chen ....................... G06F 21/64 |
| 2021/0264014 A1* | 8/2021 | Wu ....................... H04L 9/0822 |

FOREIGN PATENT DOCUMENTS

| | | |
|---|---|---|
| TW | 201027295 A | 7/2010 |
| TW | 112632642 A | 3/2019 |

OTHER PUBLICATIONS

"Checkpointing & Rollback Recovery"—Bui et al, University of Illinois at Chicago, Nov. 2, 1986 https://www.cs.uic.edu/~ajayk/Checkpointing.pdf (Year: 1986).*

TW Office Action dated Aug. 4, 2022 in Taiwan application (No. 110133136).

* cited by examiner

REAL TIME CLOCK WITH INTEGRATED ANTI-ROLLBACK PROTECTION

BACKGROUND OF THE INVENTION

1. Field of the Invention

This application relates to a real time clock, and specifically to a real time clock having integrated anti-rollback protection.

2. Description of the Prior Art

System-On-Chip (SoC) devices comprise one or more CPUs with associated memory, logic and interface resources. These systems typically contain a Real Time Clock (RTC), which is used to indicate the time. This RTC typically tracks the date, the month and the year as well as the time to the second. When the system is powered down the RTC typically continues to operate because it usually has a battery backed-up power supply that allows it to continue to maintain its accuracy even if the rest of the CPUs and system is powered off.

The RTC is a critical component of many systems because the time that it tracks is used to maintain many aspects of the system infrastructure. For example, network timestamps, file edit dates, calendar functions, etc. are all related to the RTC accuracy.

Many security features of SoCs also rely on timestamps provided by RTCs. For example, system access certificates and credentials often contain a timestamp. Additionally software version activation or deactivation is often synchronized across large distributed systems by enabling/disabling at a specific time.

This reliance on the RTC means that it is critical that the RTC maintain an accurate time and that the RTC is immune from tampering which might seek to alter the reported time. The most common failure method for an RTC security attack is for an attacker to "roll back" the time by setting the RTC to a time that is in the past. This defeats security policies or software revisions that depend on the RTC to strictly reflect an increasing time.

SUMMARY OF THE INVENTION

To address these issues, an application-specific integrated circuit (ASIC) is proposed. The proposed ASIC comprises a Real-Time Clock (RTC) block configured to output a current time, a checkpoint memory block coupled to the RTC block and configured to comprise a stored active date/time checkpoint, and a set RTC logic block coupled to the checkpoint memory block and to the RTC block and configured to permit setting the RTC block to an asserted new time request only when the asserted new time is in the future relative to the stored active date/time checkpoint. The active date/time checkpoint is the date/time checkpoint most recently stored in the checkpoint memory block. The active date/time checkpoint is stored in a non-volatile, single-write memory location such as in a one-time programmable (OTP) memory or in a bank of fuses so that the stored active date/time checkpoint is maintained whether or not power is interrupted to the checkpoint memory block.

A method of updating a real-time clock (RTC) block in the application-specific integrated circuit (ASIC) comprises the set RTC logic block receiving a request to update the RTC block to a new date and/or time, determining whether the new date and/or time is in the future relative to an active date/time checkpoint stored in the checkpoint memory block, updating the RTC block to the new date and/or time when determined the new date and/or time is in the future relative to the active date/time checkpoint stored in the checkpoint memory block, and not updating the RTC block to the new date and/or time when determined the new date and/or time is not in the future relative to the active date/time checkpoint stored in the checkpoint memory block.

These and other objectives of the present invention will no doubt become obvious to those of ordinary skill in the art after reading the following detailed description of the preferred embodiment that is illustrated in the various figures and drawings.

DETAILED DESCRIPTION

A typical way to protect a Real Time Clock (RTC) from incorrect or illegal modification is to control access to the ability to set the RTC. This means that only certain secure software processes running on a CPU can set the RTC to a new time. However, this type of security is difficult to guarantee since it relies on many aspects of the system (CPU, bus fabric, software) to be constructed correctly. This is difficult to audit and has been broken and exploited in the past.

To solve these issues, a real time clock (RTC) with integrated anti-rollback protection is proposed. This hardware block may be implemented in an application-specific integrated circuit (ASIC) utilizing a separate battery-backed up power supply which allows it to continue to operate when the rest of the system is powered off. The entire anti-rollback RTC block 100 is described in FIG. 1.

Figure 1:
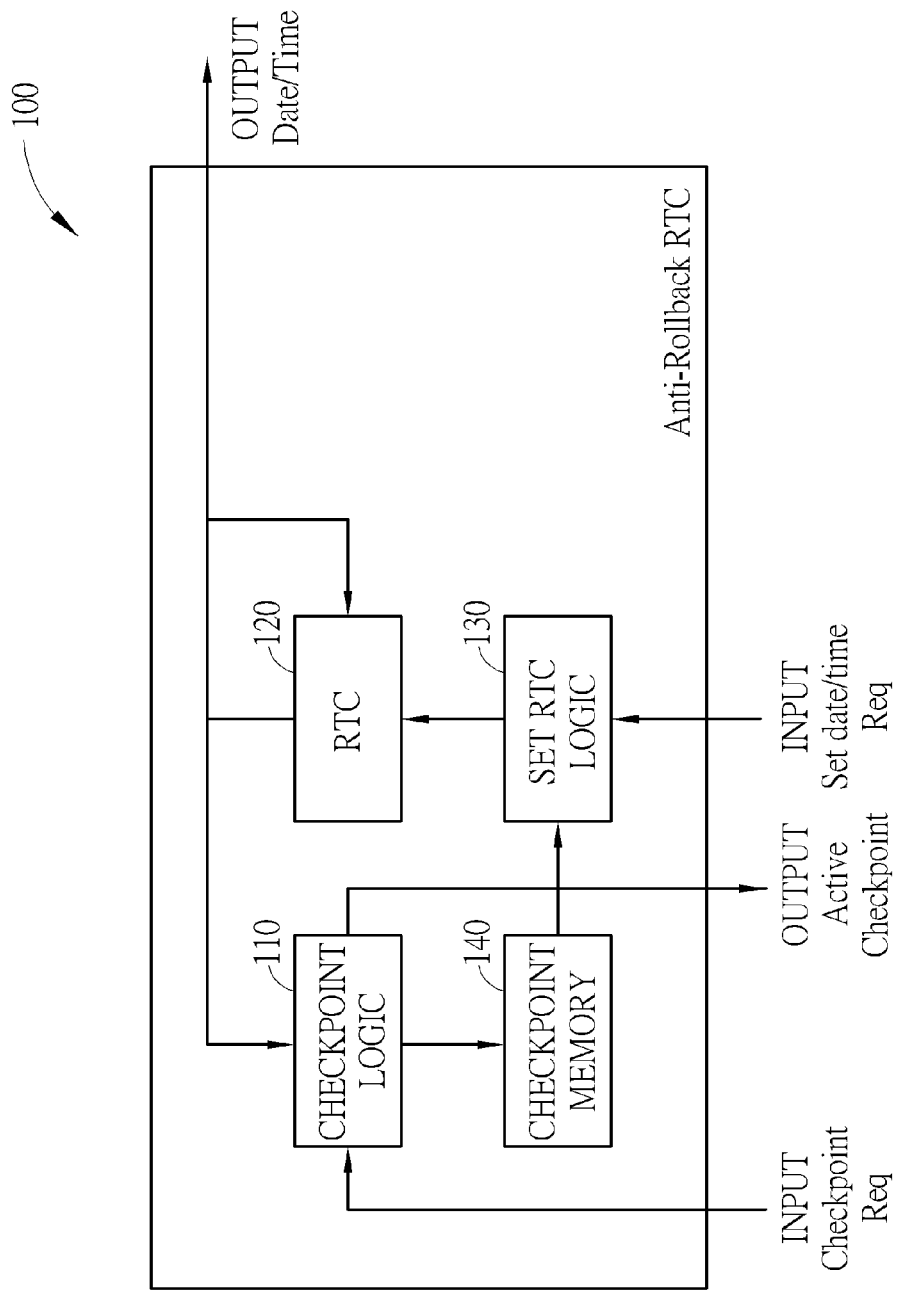
FIG. 1 is a block diagram of an Anti-Rollback RTC.

The anti-rollback RTC block 100 of FIG. 1 comprises a checkpoint logic block 110, an RTC block 120, a set RTC logic block 130, and a checkpoint memory block 140. The anti-rollback RTC block 100 further comprises busses and/or data paths connecting the blocks and two inputs and two outputs as shown.

A very general non-limiting explanation of the functioning of the anti-rollback RTC block 100 is a follows. The checkpoint memory block 140 allows data to be written to the block permanently (such as with a bank of fuses or a one-time programmable (OTP) memory). The RTC block 120 outputs the current time and date from the RTC every second for system use.

When the system tries to set a new checkpoint using the input checkpoint request, the checkpoint logic block 110 gets the current time from the RTC block 120 and stores the current time in the checkpoint memory block 140 as the new checkpoint. The system can read the current checkpoint via the checkpoint logic block 110 at the output active checkpoint.

When the system tries to update the RTC to a new time using the input set date/time request, the set RTC logic block 130 compares the new time (e.g. the time being inputted) to the most recent checkpoint obtained from the checkpoint memory block 140. If the new time is after the most recent checkpoint, the RTC is updated to the new time. If the new time is not after the most recent checkpoint, the request to update the RTC is rejected and no changes are made to the system.

The RTC block 120 maintains the date and time by counting the oscillations of a stable source, usually a 32 kHz quartz crystal. Every second the RTC updates its output date and time to reflect the passage of time. The RTC block 130 has the input set date/time request that allows the time and date to be directly set. The output of the RTC block 130, which is the current date and time, is available to the rest of the system at the output data/time for use as required.

Figure 2:
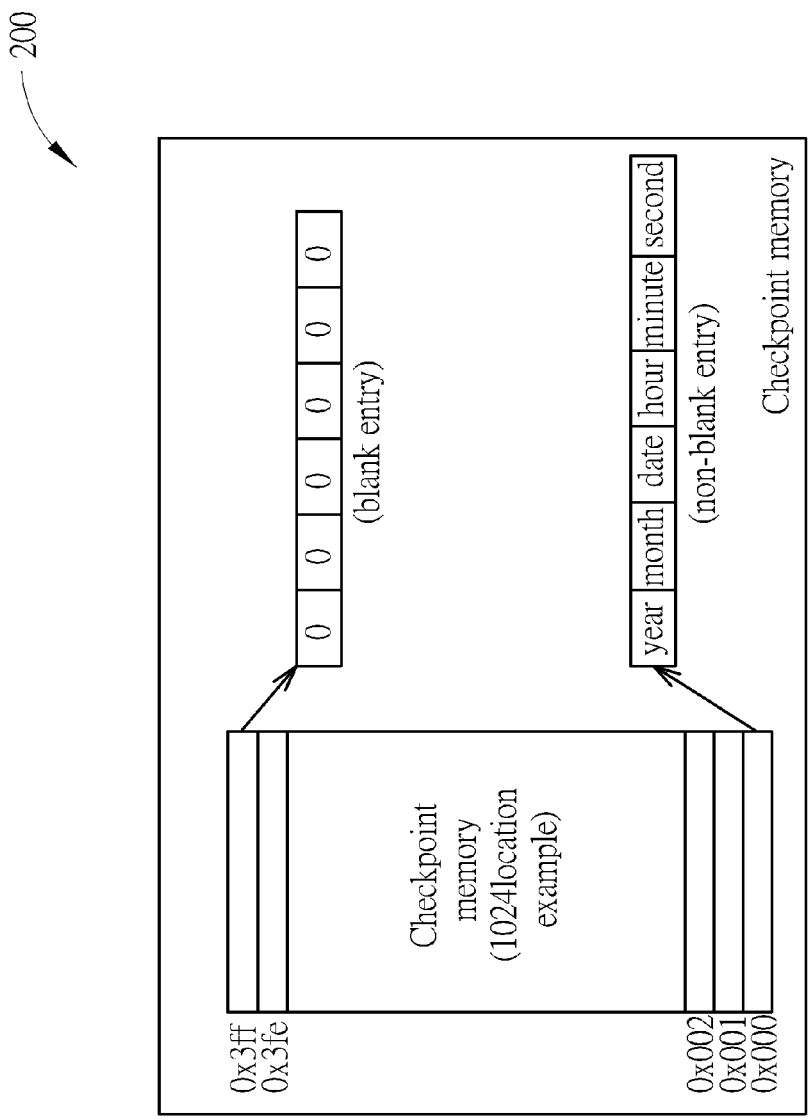
FIG. 2 illustrates a possible checkpoint memory organization.

The checkpoint memory block 140 may be implemented using a memory technology which allows data to be written to the block permanently (such as a bank of fuses or an OTP (One Time Programmable) memory). This block stores the date and time of each checkpoint that has been committed to the system. Each entry in the checkpoint memory block 140 is either blank (all zeros) or non-zero. FIG. 2 shows a possible format of the stored checkpoint entry. The checkpoint memory block 140 comprises a block or array 200 of memory locations, shown here as indexed 0x000 to 0x3ff. Each memory location may comprise a plurality of fields corresponding to the, year, month, date, hour, minute, and second of a stored checkpoint.

As each memory location in the checkpoint memory block 140 can be written to once and only once, normally new checkpoints are added in successively increasing memory locations, simplifying record keeping. The checkpoint memory block 140 may contain sufficient storage for many possible checkpoints. In one embodiment the checkpoint memory block 140 contains 1024 entries.

The checkpoint logic block 110 controls writes to the checkpoint memory block 140. When the system desires to store the current RTC time as a checkpoint the checkpoint input is asserted. This causes the checkpoint logic block 110 to store the current date and time into the next available blank entry in the checkpoint memory using the format of FIG. 2. The current date/time must be strictly larger than the most recent previously stored checkpoint. If not, the checkpoint logic block 110 does not allow the current date/time to be set as a new checkpoint. The checkpoint logic block 110 maintains the active entry number of the most recent stored checkpoint and outputs this on the output active checkpoint. This is useful as an output because some systems might have other external logic which is indexed to this entry number (such as information about what aspects of the system are affected by this checkpoint).

Figure 3:
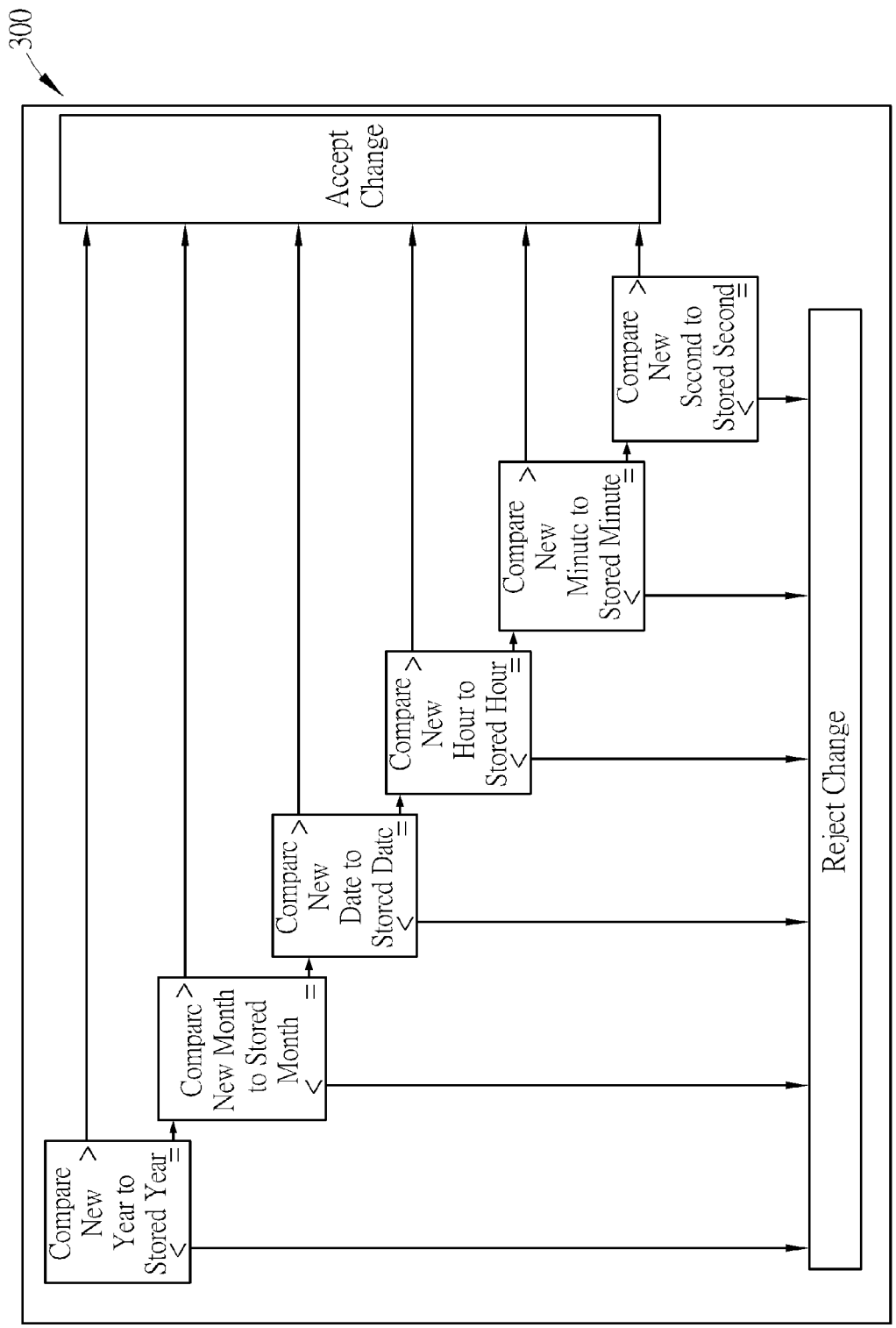
FIG. 3 is a date/time compare flowchart for determining whether to update the Anti-Rollback RTC.

The setting of the RTC is controlled by the Set RTC Logic block 130. This logic controls the ability of the system to set a time into the RTC. When the system requests to set a particular date and time into the RTC, it does so by signaling the new date and time to set on the set date/time input of the block. The logic of the set RTC logic block 130 then compares this new time with the most recent checkpoint which is obtained by scanning for the highest non-blank entry in the checkpoint memory. The request to set the RTC is only allowed if the new date and time is strictly greater than the most recent checkpoint as shown in the algorithm of FIG. 3. If the new date and time is not greater than the most recent checkpoint then the RTC is not set to a new date and time.

FIG. 3 illustrates one possible flow of determining whether to update the RTC logic block 120. In this embodiment, begin with the upper left comparison and progress diagonally until the determination is made.

Here, first the new year is compared to the stored year. If the new year is not at least as recent as the stored year, reject the change, otherwise accept change of year.

Next, the new month is compared to the stored month. If the new month is not at least as recent as the stored month, reject the change, otherwise accept change of month. Next, the new date is compared to the stored date. If the new date is not at least as recent as the stored date, reject the change, otherwise accept change of date. Next, the new hour is compared to the stored hour. If the new hour is not at least as recent as the stored hour, reject the change, otherwise accept change of hour. Next, the new minute is compared to the stored minute. If the new minute is not at least as recent as the stored minute, reject the change, otherwise accept change of minute. Lastly, the new second is compared to the stored second. If the new second is not at least as recent as the stored second, reject the change, otherwise accept change of second.

When the ASIC is manufactured the contents of the checkpoint memory block 140 are totally blank. This allows the time to be initially set as soon as the RTC has power. Software will set the RTC using the set data/time input of the block.

Once operating, the RTC will maintain the date and time and update the output date and time every second. At some point, software in the system will desire to create an anti-rollback checkpoint and will do so by asserting the checkpoint input of the block.

At this point the checkpoint logic block 130 will store the current date and time into the lowest available blank entry which will be entry 0x0 initially. The active rollback entry output of the block will now contain 0x0 to reflect the fact that this entry is the current checkpoint.

Now at some future time an attempt will be made to "roll back" the RTC by setting it to a time prior to the date/time stored in the active checkpoint memory block 140 entry (entry 0x0). When this is attempted by asserting a date/time on the set date/time input, the set RTC logic block 130 will reject this attempt because it determines that the requested date/time to set is before the active checkpoint. The RTC will not be modified.

Later the system might decide to create a new anti-rollback checkpoint. The checkpoint input will be asserted and the checkpoint logic block will again take the current date/time and store it in the lowest available blank entry. It will then update the checkpoint output to reflect the new checkpoint entry.

At some later time software might decide that it is necessary to update the RTC block 120. Software asserts a new time on the set date/time input of the block. The set RTC logic block 130 confirms this new time is in the future relative to the active stored checkpoint and if so allows the RTC date/time to be updated.

Note that if the power is completely removed from the anti-rollback RTC block 100 the checkpoint memory will continue to maintain its list of checkpoints. When power is restored to the block the checkpoint logic block 110 will be able to determine which is the active checkpoint by scanning the checkpoint memory block 140 from its highest entry downwards until it finds a non-blank entry. This provides the anti-rollback RTC the ability to maintain the RTC anti-rollback feature even if the power to the block is interrupted.

This new proposal provides a way for hardware in the ASIC to guarantee that the RTC can never be rolled back beyond a checkpointed date and time. This allows software to depend on the fact that the RTC is always strictly increasing and therefore defeats all security attacks which depend on setting an RTC to a time in the past.

This new proposal maintains its anti-rollback protection of the RTC through all phases of RTC operation [meaning when the SoC is fully operated and when the SoC is powered down and the RTC is operating from battery power.

The new proposal provides for multiple time checkpoints so that the anti-rollback feature can be maintained over time in conjunction with system events (such as major software upgrades, security certificate issuance, etc.).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus having an anti-rollback protection, the apparatus comprising:
    a Real-Time Clock (RTC) block configured to output a current time;
    a checkpoint memory being a non-volatile memory comprising a plurality of memory locations, each memory location being a one-time programmable memory location configured to store an active date/time checkpoint;
    a checkpoint logic block coupled serially between the RTC block and the checkpoint memory block, the checkpoint logic block configured to receive an inputted checkpoint request to store a new checkpoint generated by the RTC block as a new stored active date/time checkpoint into the checkpoint memory block, only if the active date/time is larger than a previously-stored date/time, otherwise checkpoint logic does not permit the storage of the active date/time; and
    a set RTC logic block coupled serially between the checkpoint memory block and to the RTC block and configured to permit setting the RTC block to an asserted new time request only when the asserted new time is in the future compared with the stored active date/time checkpoint;
    wherein the active date/time checkpoint is the date/time checkpoint most recently stored in the checkpoint memory block.

2. The apparatus of claim 1, wherein the checkpoint logic block is further configured to output the currently active date/time checkpoint.

3. The apparatus of claim 2, wherein the checkpoint logic block is further configured to output the currently active date/time checkpoint to provide a checkpoint index to other logic to use to track system changes and checkpoints.

4. The apparatus of claim 1, wherein the single-write memory locations are in a one-time programmable (OTP) memory or a bank of fuses.

5. The apparatus of claim 1, wherein the single-write memory locations maintain the stored active date/time checkpoint whether or not power is interrupted to the checkpoint memory block.

6. The apparatus of claim 1, wherein the apparatus can have its stored active date/time checkpoint changed only when the new active date/time checkpoint is forward in time compared with its stored active date/time checkpoint and by setting a new active date/time checkpoint.

7. The apparatus of claim 1, wherein the apparatus provides for multiple time checkpoints so that the anti-rollback protection is maintained over time in conjunction with at least one of software upgrade and security certificate issuance.

8. A method of updating a real-time clock (RTC) block in an anti-rollback apparatus comprising the Real-Time Clock (RTC) block, a checkpoint memory block, and a set RTC logic block, the method comprising:
    the set RTC logic block receiving a request to update the RTC block to a new date or time;
    determining whether the new date or time is in the future compared with an active date/time checkpoint stored in the checkpoint memory block, the checkpoint memory block being a non-volatile memory comprising a plurality of memory locations, each memory location being a one-time programmable memory location;
    updating the RTC block to the new date or time when the new date or time is in the future compared with the active date/time checkpoint stored in the checkpoint memory block; and
    not updating the RTC block to the new date or time when determined the new date or time is not in the future compared with the active date/time checkpoint stored in the checkpoint memory block;
    changing the stored active date/time checkpoint in the checkpoint memory block only when a new active date/time checkpoint is forward in time compared with the stored active date/time checkpoint and setting a new active date/time checkpoint, otherwise not changing the stored active date/time checkpoint;
    wherein the active date/time checkpoint is the date/time checkpoint most recently stored in the checkpoint memory block.

9. The method of claim 8, further comprising receiving an inputted checkpoint request to store a new checkpoint generated by the RTC block as a new stored active date/time checkpoint into the checkpoint memory block.

10. The method of claim 8, further comprising outputting the currently active date/time checkpoint.

11. The method of claim 10, further comprising outputting the currently active date/time checkpoint to provide a checkpoint index to other logic to use to track system changes and checkpoints.

12. The method of claim 8, further comprising storing the active date/time checkpoint in single-write memory locations.

13. The method of claim 12, further comprising maintaining values of the stored active date/time checkpoint in the single-write memory location when power is interrupted to the checkpoint memory block.

14. The method of claim 8, wherein the anti-rollback apparatus provides for multiple time checkpoints so that an anti-rollback protection is maintained over time in conjunction with at least one of software upgrade and security certificate issuance.

* * * * *